(12) United States Patent
McCarthy et al.

(10) Patent No.: US 8,789,035 B2
(45) Date of Patent: Jul. 22, 2014

(54) METHOD AND APPARATUS FOR UPDATING FIRMWARE

(75) Inventors: Patrick McCarthy, London (GB); Husien Hong, London (GB)

(73) Assignee: Nokia Corporation, Espoo (FI)

( * ) Notice: Subject to any disclaimer, the term of this patent is extended or adjusted under 35 U.S.C. 154(b) by 513 days.

(21) Appl. No.: 13/128,615

(22) PCT Filed: Nov. 4, 2009

(86) PCT No.: PCT/IB2009/054889
§ 371 (c)(1),
(2), (4) Date: Aug. 22, 2011

(87) PCT Pub. No.: WO2010/052647
PCT Pub. Date: May 14, 2010

(65) Prior Publication Data
US 2012/0030665 A1 Feb. 2, 2012

(30) Foreign Application Priority Data
Nov. 10, 2008 (GB) .................................. 0820529.6

(51) Int. Cl.
*G06F 9/445* (2006.01)

(52) U.S. Cl.
USPC ............ 717/171; 717/168; 717/172; 717/178

(58) Field of Classification Search
USPC ........................ 717/168–178; 455/418–420; 709/220–222
See application file for complete search history.

(56) References Cited

U.S. PATENT DOCUMENTS

| | | | | |
|---|---|---|---|---|
| 7,096,311 B2* | 8/2006 | Chiang | | 711/100 |
| 7,480,907 B1* | 1/2009 | Marolia et al. | | 717/174 |
| 7,555,640 B2* | 6/2009 | Helvick | | 713/1 |
| 2004/0092255 A1* | 5/2004 | Ji et al. | | 455/419 |
| 2004/0215755 A1* | 10/2004 | O'Neill | | 709/223 |
| 2005/0204353 A1* | 9/2005 | Ji | | 717/168 |
| 2006/0041881 A1* | 2/2006 | Adkasthala | | 717/168 |
| 2006/0179367 A1* | 8/2006 | Cho et al. | | 714/710 |
| 2007/0214344 A1 | 9/2007 | Helvick | | |

(Continued)

FOREIGN PATENT DOCUMENTS

| | | |
|---|---|---|
| EP | 1624707 A1 | 2/2006 |
| JP | 10198614 A | 7/1998 |

(Continued)

OTHER PUBLICATIONS

Nilsson et al., Secure Firmware Updates over the Air in Intelligent Vehicles, IEEE, 2008, pp. 380-384.*

(Continued)

*Primary Examiner* — Wei Zhen
*Assistant Examiner* — Satish Rampuria
(74) *Attorney, Agent, or Firm* — Harrington & Smith

(57) ABSTRACT

A method and apparatus for updating firmware using a firmware-over-the-air update. The apparatus comprises a plurality of repository files each comprising one or more settings. The apparatus is configured to store a specified value corresponding to at least one of the settings. The apparatus is capable of receiving a firmware over-the-air update which overwrites at least one repository file with an updated version. The apparatus is capable of identifying repository files which have been changed by the update and for which at least one corresponding specified value exists. Identification is achieved by comparing representations of repository files. Further, the apparatus is capable of merging updated repository files to retain specified values.

15 Claims, 6 Drawing Sheets

(56) References Cited

U.S. PATENT DOCUMENTS

| | | |
|---|---|---|
| 2008/0030757 A1 | 2/2008 | Ingles et al. |
| 2008/0065816 A1 | 3/2008 | Seo |

FOREIGN PATENT DOCUMENTS

| | | |
|---|---|---|
| KR | 20080017814 A | 2/2008 |
| KR | 20080083512 A | 9/2008 |
| WO | 2007/148899 A1 | 12/2007 |
| WO | 2008/007922 A1 | 1/2008 |
| WO | 2008038063 A1 | 4/2008 |

OTHER PUBLICATIONS

Wang et al., Software Downloading in Reconfigurable Networks of Open Wireless Architecture Using SDR Technology, IEEE, 2006, pp. 128-134.*

Open Mobile Alliance, Firmware Update Management Object, Open Mobile Alliance Ltd., Version 1.0—Jun. 15, 2006, pp. 1-32.*

European Search Report received for Patent Application No. 09824481.7, dated Apr. 4, 2012, 5 pages.

International Search Report received for corresponding Patent Cooperation Treaty Application No. PCT/IB2009/054889, dated Feb. 11, 2010, 11 pages.

International Preliminary Report received for corresponding Patent Cooperation Treaty Application No. PCT/IB2009/054889, dated May 10, 2011, 7 pages.

Office Action received for corresponding European Patent Application 09824481.7, dated Feburary 11, 2012, 4 pages.

Search Report received for corresponding United Kingdom Patent Application No. 0820529.6, dated Feb. 10, 2009, 3 pages.

* cited by examiner ic device such as, for example, a smartphone or
METHOD AND APPARATUS FOR UPDATING FIRMWARE

RELATED APPLICATION

This application was originally filed as PCT Application No. PCT/IB2009/054889 filed Nov. 4, 2009, which claims priority benefit to Great Britain Patent Application No. 0820529.6, filed Nov. 10, 2008.

TECHNICAL FIELD

This invention relates to an apparatus and method for updating firmware and, in particular, to updating firmware via a firmware over-the-air update.

BACKGROUND

A computing device such as, for example, a smartphone or a personal digital assistant operates according to firmware running on the device. From time to time the firmware may require updating. Firmware updates may be required to improve the operation of the computing device by, for example, enabling existing functionality to operate more efficiently or correcting malfunctioning functionality so that it operates as intended. Additionally or alternatively, a firmware update may be required to provide a new device functionality. One way to update the firmware of a computing device is by using a firmware over-the-air (FOTA) update.

SUMMARY OF EXAMPLES OF THE INVENTION

A first example of the invention provides a method comprising: receiving a firmware over-the-air update in an apparatus having a plurality of repository files, each repository file comprising one or more settings, at least one setting of each repository file being modifiable to equal one of, one or more corresponding specified values, the update overwriting at least one repository file with an updated version; identifying repository files for which at least one corresponding specified value exists; and, detecting those identified repository files which have been updated by comparing a representation of each identified repository file from before the update was received with a representation of the identified repository file after the update was received, and for the or each updated identified repository file, merging the at least one corresponding specified value with the updated identified repository file.

A second example of the invention provides an apparatus, comprising: at least one processor; and at least one memory including computer program code, the at least one memory and the computer program code configured to, with the at least one processor, cause the apparatus to perform at least the following: receive a firmware over-the-air update in the apparatus, the apparatus having a plurality of repository files, each repository file comprising one or more settings, at least one setting of each repository file being modifiable to equal one of, one or more corresponding specified values, the update overwriting at least one repository file with an updated version; identify repository files for which at least one corresponding specified value exists; and, detect those identified repository files which have been updated by comparing a representation of each identified repository file from before the update was received with a representation of the identified repository file after the update was received, and for the or each updated identified repository file, merge the at least one corresponding specified value with the updated identified repository file. In an example, the apparatus is a mobile phone.

A third example of the invention provides an apparatus, comprising: means for receiving a firmware over-the-air update in the apparatus, the apparatus having a plurality of repository files, each repository file comprising one or more settings, at least one setting of each repository file being modifiable to equal one of, one or more corresponding specified values, the update overwriting at least one repository file with an updated version; means for identifying repository files for which at least one corresponding specified value exists; and, means for detecting those identified repository files which have been updated by comparing a representation of each identified repository file from before the update was received with a representation of the identified repository file after the update was received, and for the or each updated identified repository file, merging the at least one corresponding specified value with the updated identified repository file.

A fourth example of the invention provides a computer program, comprising: code for receiving a firmware over-the-air update in an apparatus having a plurality of repository files, each repository file comprising one or more settings, at least one setting of each repository file being modifiable to equal one of, one or more corresponding specified values, the update overwriting at least one repository file with an updated version; code for identifying repository files for which at least one corresponding specified value exists; code for detecting those identified repository files which have been updated by comparing a representation of each identified repository file from before the update was received with a representation of the identified repository file after the update was received; and for the or each updated identified repository file, merging the at least one corresponding specified value with the updated identified repository file.

A fifth example of the invention provides a computing device having a plurality of repository files each comprising one or more settings, the computing device being configured to store a specified value corresponding to at least one of the settings; wherein the computing device is capable of receiving a firmware over-the-air update which overwrites at least one repository file with an updated repository file; and, wherein the computing device includes a repository server capable of identifying repository files for which at least one corresponding specified value exists, and detecting those identified repository files which have been updated by comparing a representation of each identified repository file from before the update was received with a representation of the identified repository file after the update was received, and for the or each updated identified repository file, merging the at least one corresponding specified value with the updated identified repository file.

BRIEF DESCRIPTION OF THE DRAWINGS

Example embodiments of the invention are hereinafter described with reference to the accompanying diagrams wherein.

DESCRIPTION OF EXAMPLES OF THE INVENTION

A first example embodiment of the invention will now be described with reference to FIGS. 1 to 6.

Figure 1:
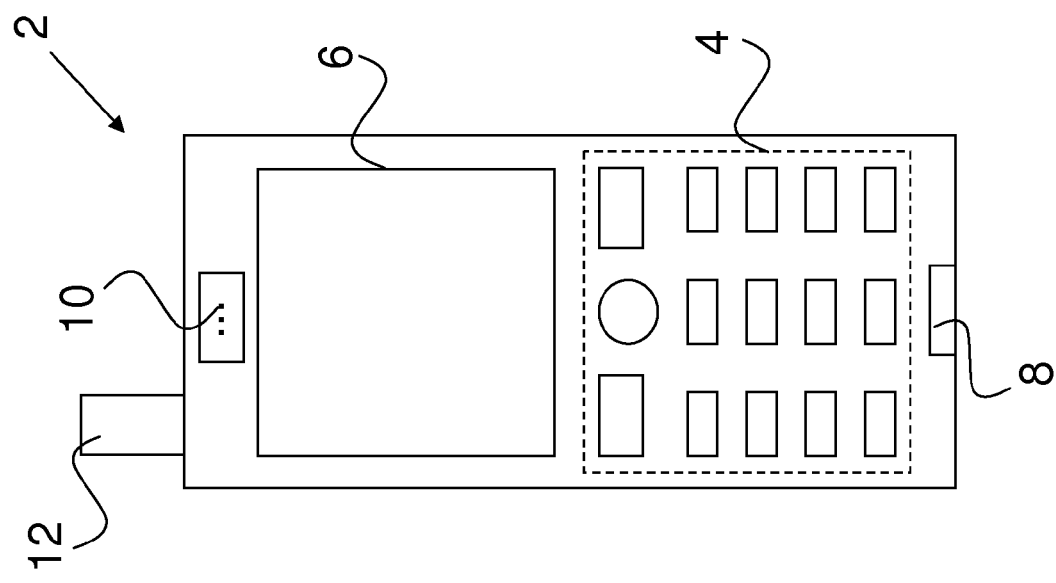
FIG. 1 is a schematic diagram of a computing device according to a first example embodiment of the invention.

The example embodiment of FIG. 1 shows an apparatus, such as a smartphone 2. It should be understood that an apparatus as illustrated and hereinafter described is merely illustrative of an apparatus that could benefit from example embodiments of the invention and therefore, should not be taken to limit the scope of the invention. While one example embodiment of the apparatus is illustrated and will be hereinafter described for purposes of example, other types of apparatus, such as, but not limited to, portable digital assistants (PDAs), pagers, mobile computers, desktop computers and other types of electronic systems, may readily employ examples of the invention.

In the example embodiment of FIG. 1, the smartphone 2 comprises a keypad 4, a display screen 6, a microphone 8, a speaker 10 and an antenna 12. In that example embodiment, the smartphone 2 is capable of being operated by a user to perform a variety of different functions, such as, for example, hosting a telephone call, browsing the internet or sending an email.

Figure 2:
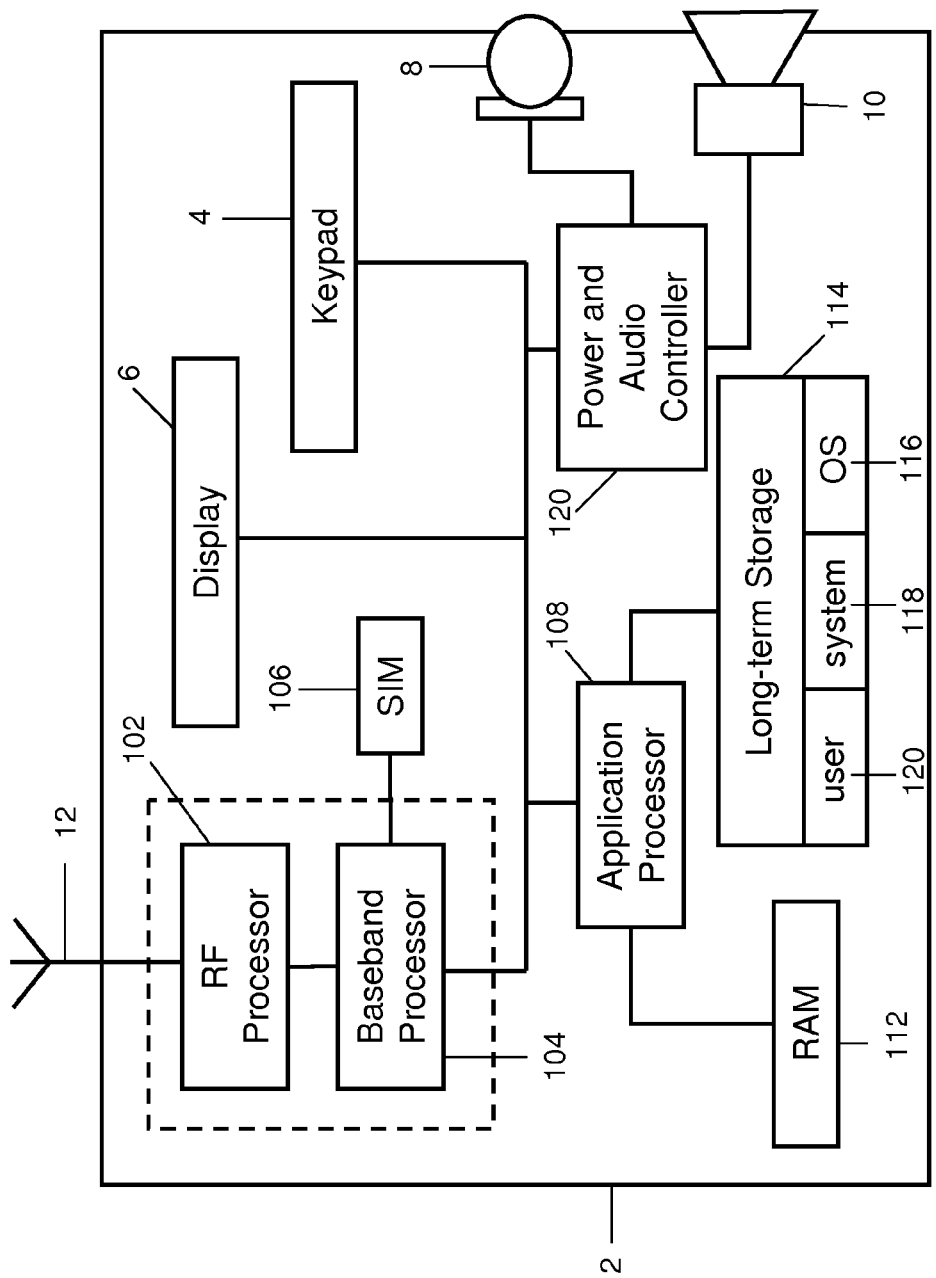
FIG. 2 is a block diagram representing the computing device of FIG. 1.

In the example embodiment of FIG. 2, a schematic view of some internal hardware elements which are part of the smartphone 2 is shown. In this example embodiment, the smartphone 2 comprises hardware to perform telephony functions, together with an application processor and corresponding support hardware to enable the phone to have other functions which may be desired by a smartphone, such as, for example, messaging, internet browsing, email functions and the like. In this example embodiment, the telephony hardware is represented by the RF processor 102 which provides an RF signal to the antenna 12 for, for example, the transmission of telephony signals, and the receipt therefrom. In this example embodiment, the smartphone 2 additionally comprises a baseband processor 104 which provides signals to and receives signals from the RF Processor 102. In this example embodiment, the baseband processor 104 also interacts with a subscriber identity module 106.

In this example embodiment, the keypad 4 and the display 6 are controlled by an application processor 108. In this example embodiment, a power and audio controller 120 supply power from a battery (not shown) to the telephony subsystem, the application processor, and the other hardware. Additionally, in this example embodiment, the power and audio controller 120 control input from the microphone 8, and audio output via the speaker 10.

In this example embodiment, in order for the application processor 108 to operate, various different types of memory are provided. Firstly, in this example embodiment the smartphone 2 includes Random Access Memory (RAM) 112 in communication with the application processor 108. In this example embodiment, data and program code can be written into and read from the RAM 112 at will. In this example embodiment, code placed in RAM 112 can be executed by the application processor 108 from the RAM 112. In this example embodiment, the RAM 112 represents a volatile memory of the smartphone 2.

Secondly, in this example embodiment the smartphone 2 is provided with a long-term storage 114 in communication with the application processor 108. In this example embodiment, the long-term storage 114 comprises three partitions, an operating system (OS) partition 116, a system partition 118 and a user partition 120. In this example embodiment, the OS partition 116 contains the firmware of the smartphone 2.

In this example embodiment, firmware enables internal hardware elements of the smartphone 2 to function and allow higher-level software to run on the hardware. For example, firmware is a software program or set of instructions embedded on the smartphone. Further, firmware is stored as a package of software that is capable of starting up and running in isolation to other software. In this example embodiment, in order to ensure that the firmware can operate in this way it is protected and therefore, the smartphone is prevented from easily updating firmware, for example, to incorporate modifications such as, for example, user modifications. In view of this, firmware can thought of as "semi-permanent" since in some example embodiments the only way in which the firmware can be updated is if a new firmware version is transmitted to the smartphone 2 to replace the existing version. In this example embodiment, these characteristics of firmware distinguish it from other types of software which, for example, can be modifiable during operation by the smartphone or by a human user of the device.

In this example embodiment, the firmware of the smartphone 2 includes an operating system. An operating system is necessary in order for the application processor to operate and therefore, the operating system is started as soon as the smartphone system 2 is first switched on.

As stated, the representation of FIG. 2 is schematic. In practise, in some example embodiments the various functional components illustrated are substituted into one and the same component. For example, the baseband processor, the RF processor and the application processor are provided by a single processor component. Further, the long-term storage 114 can comprise NAND flash, NOR flash, a hard disk drive or any combination of these.

In this example embodiment, the application processor 108 contains a central repository server which controls and manages various software elements on the computing device. In this example embodiment, one of the roles of the central repository server is to organise and manage the various firmware settings stored on the OS partition 116. For example, the central repository server stores and maintains cyclic redundancy check values for the firmware settings and thereby detects when any of the settings have been corrupted. In this example embodiment, permission to write to the OS partition 116 is restricted to help prevent corruption of the data it contains and thereby, help preserve the integrity of the computing device. Accordingly, in this example embodiment the OS partition 116 is thought of as a read-only portion of the long-term storage 114.

In this example embodiment, other computer programs may also be stored on the long-term storage 114, such as, for example, application programs, and the like. In particular, application programs which are mandatory to the device, such as, for example, in the case of a smartphone, communications applications and the like may be stored in the system partition 118. The application programs stored on the system partition 118 may be those which are bundled with the smartphone by the device manufacturer when the phone is first sold. In this example embodiment, permission to write to the system partition 118 is less restricted than the OS partition 116 because, the data contained on the system partition 118 is not necessarily as critical to the device's fundamental operation. Accordingly, in this example embodiment the system partition 118 is thought of as a writable portion of the long-term storage 114.

In this example embodiment, application programs which are added to the smartphone by the user are stored in the user partition 120. In this example embodiment, the long-term storage 114 represents a non-volatile memory of the smartphone 2.

In this example embodiment, the smartphone 2 is capable of receiving a FOTA update during operation from a cellular network within range of the smartphone 2. In this example embodiment the smartphone 2 provides a means for receiving a FOTA update. In this example embodiment, a FOTA update is a section of computer code which is received by the smartphone 2 wirelessly via a mobile network, such as, for example, a GSM network. Each FOTA update contains an updated version of at least a portion of the firmware of the smartphone 2. For example, if the purpose of a FOTA update is to fix a bug affecting the operation of a display screen 6 of the smartphone 2, then the update may contain updated firmware for at least a portion of the firmware relating to the display screen functionality. In this example embodiment, the size of the updated firmware portion depends on the specifics of the bug and the corresponding bug fix. In this example embodiment, when the smartphone 2 receives the FOTA update, the updated firmware portion contained within the update overwrites a corresponding portion of the existing firmware present on the smartphone 2. In this example embodiment, this act of overwriting installs the updated firmware onto the smartphone 2 and thereby updates the firmware of the smartphone 2.

In this example embodiment, the smartphone 2 contains many different file-based application and system settings which may be modified during operation, such as, for example, by a user of the smartphone 2. For example, the smartphone 2 permits a user to customise telephony settings, such as, for example, a ring tone or a ring tone volume. Additionally, the smartphone 2 may comprise a radio functionality and permit the user to customise settings, such as, radio station presets or radio volume. In this example embodiment, the smartphone 2 permits the user to customise or modify settings relating to at least some of the device's functionality. In this example embodiment, in the absence of a user-specified setting, it is necessary to provide at least a default setting. In this example embodiment, default settings are stored in the firmware of the smartphone 2. Hereinafter the term 'setting' is used to refer to settings of the smartphone 2 that are stored as firmware.

In this example embodiment, for each setting, a setting identifier, a default value and a possible range of values are stored as firmware on the OS partition 116. Such data relates to settings in their default or unmodified state. In this example embodiment, any customisations or modifications made to each setting are stored as modifiable data (i.e. not firmware) in a different location on the long-term storage 114, such as, for example, the system partition 118.

In this example embodiment, on the long-term storage 114, settings relating to a common functionality, such as, for example, a telephony functionality or a radio functionality, may be grouped together in a single file called a 'repository file'. In particular, in this example embodiment the term repository file is used to describe the physical data stored on the long-term storage 114 relating to the group of related settings. In this example embodiment, a group of related settings is known as a 'profile' and this term describes a group of settings contained within a single repository file. The term 'profile' provides a functional description of the group of settings.

In this example embodiment, all repository files of the smartphone 2 are stored in their unmodified or default state as firmware in the OS partition 116. Also, for those repository files for which modifications are specified, a second version of the repository file incorporating those modifications is stored as modifiable data in the system partition 118. Therefore, in this example embodiment, if modifications are specified for a repository file, two versions of that file exist on the long-term storage 114. Conversely, if no modifications are specified for a repository file, one version of repository file exists on the long-term storage 114.

In this example embodiment, as mentioned, data relating to settings in their default state are stored on the smartphone 2 as firmware. Therefore, this data can be updated by a FOTA update. In this example embodiment, a FOTA update can only contain new or updated settings as part of a repository file and not as individual settings in isolation. Therefore, in this example embodiment a FOTA update may only provide complete repository files and any settings of a repository file not changed by a FOTA update are included in the update in their unchanged state. Additionally, in this example embodiment a FOTA update can contain a copy of every repository file of the computing device. Those repository files which are changed by the FOTA are included in the FOTA in their changed form. Those repository files which are not changed by the FOTA update are nonetheless included but in their existing form. It is also to be understood that in this example embodiment a FOTA update can update many other aspects of the firmware in addition to repository files.

Figure 3:
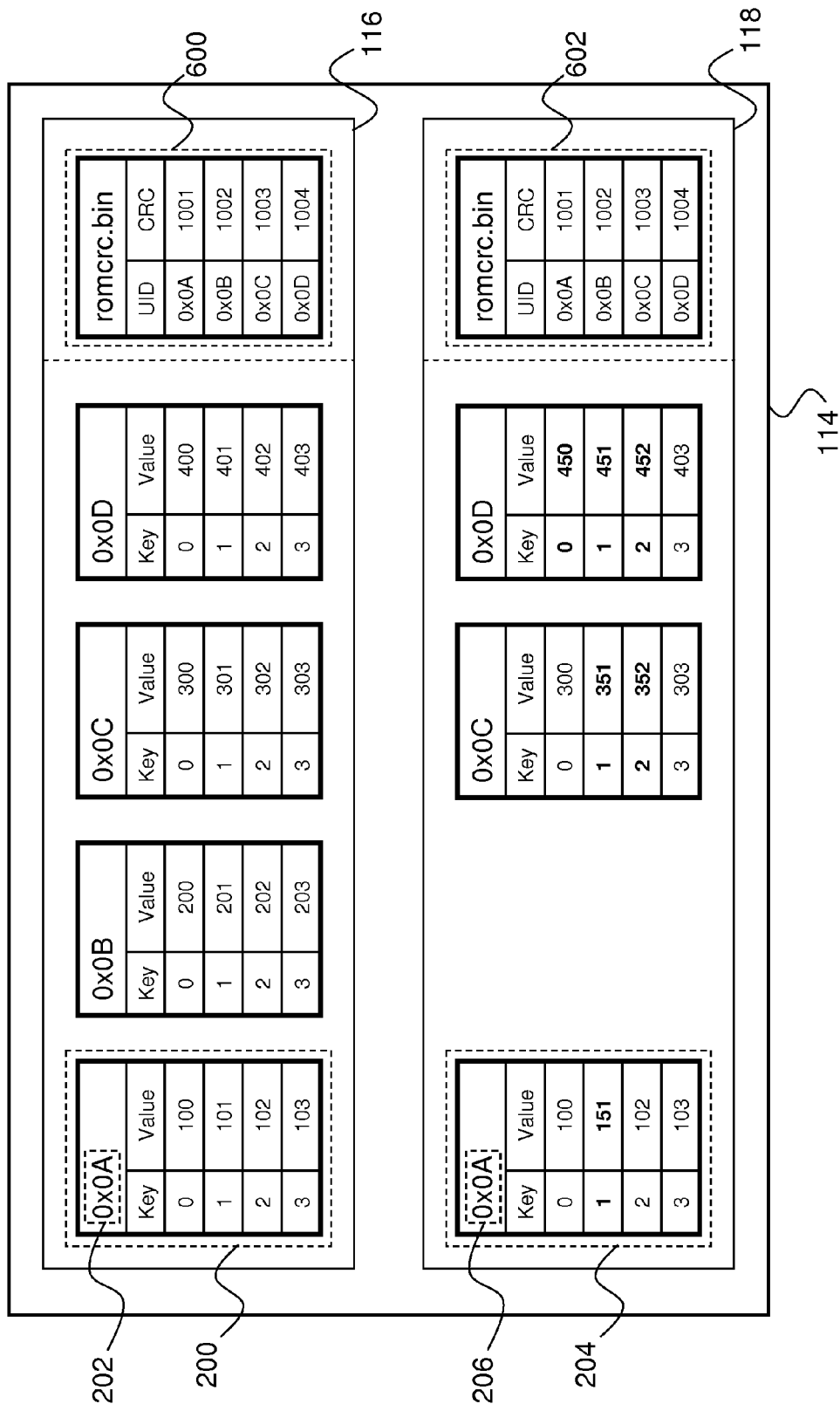
FIGS. 3, 5 and 6 are schematic diagrams of repository files arranged on the computing device of FIG. 1; and, FIG. 4 is a flow diagram describing the operation of the computing device of FIG. 1 in response to receiving a FOTA update.

The example embodiment of FIG. 3 shows a schematic representation of an exemplary arrangement of the long-term storage 114 showing only the OS partition 116 and the system partition 118.

In this example embodiment, the long-term storage 114 contains data relating to profiles of the smartphone 2. As previously mentioned, in this example embodiment a profile is a group of settings which are related to a common functionality of the smartphone 2, such as, for example, a telephony, an email or an internet-browsing functionality. In this example embodiment, each profile contains four modifiable settings and the value of each modifiable setting is modifiable by a user of the smartphone 2. In this example embodiment, data relating to a profile in its default or unmodified state is stored within a unique repository file as firmware on the OS partition 116 of the long-term storage 114. An exemplary repository file of FIG. 3 will now be described to explain the notation used throughout FIGS. 3, 5 and 6.

In this example embodiment, a repository file 200 comprises four settings, each one may be referenced by a unique key from 0 to 3. In this example embodiment, the repository file 200 further comprises a unique identifier (UID) 202 having a value of 0x0A. In this example embodiment, the UID 202 is used by the computing device 2 to identify the repository file 200. In this example embodiment, each of the four settings 0 to 3 have associated therewith data relating to the setting, such as, for example, a setting identifier, a default setting value and a possible range of values that the setting can be modified to take, for example, by a user. In this example embodiment, this data is represented by the value field wherein, each setting has a unique value associated with it. In this example embodiment, the setting with key 0 has a value of 100; the setting with key 1 has a value of 101; the setting with key 2 has a value of 102; and, the setting with key 3 has a value of 103. In this example embodiment, each of the four settings 0 to 3 is represented in their unmodified state and therefore, each setting is represented in the OS partition 116 with its default value. As mentioned above, in this example embodiment repository files are stored on OS partition 116 of the long-term storage 114 as firmware.

In this example embodiment, any user-modified values (also known as specified values) corresponding to repository files are stored as part of a second copy of the repository file within the system partition 118 as modifiable data. In this example embodiment, a second version of each repository file from the OS partition 116 is stored on the system partition 118 if user modifications are specified for that repository file. In this example embodiment, if no user modifications are specified for a repository file then a second version of the repository file is not be stored on the system partition 118. In this example embodiment, a second version of the repository file 200 is stored on the system partition 118, as indicated by reference sign 204. In this example embodiment, the repository file 204 has a UID 206 which is equal to the UID 202 of the repository file 200, i.e. the UID 206 is 0x0A. In the example embodiment of FIG. 3, emboldening of a setting key and value indicates that a user-modified value is specified for that setting. Therefore, it can be seen that in this example embodiment the setting having the key '1' has a user-modified value specified and, that value is specified as 151. In this example embodiment, no user-modified values are stored on the system partition 118 for settings 0, 2 and 3 of repository file 0x0A. Therefore, settings 0, 2 and 3 take their default values.

The elements of FIG. 3 described above with reference to the exemplary repository file 0x0A can be used to interpret the other elements of FIG. 3. The following summarises the contents of FIG. 3.

In this example embodiment, four repository files, 0x0A, 0x0B, 0x0C and 0x0D, are stored as firmware on the OS partition 116 of the long-term storage 114. Each of the repository files 0x0A to 0x0D contain four settings. In this example embodiment, the system partition 118 contains modified values for; setting 1 of the repository file 0x0A; no settings of the repository file 0x0B; settings 1 and 2 of the repository file 0x0C; and, settings 0, 1 and 2 of the repository file 0x0D. In this example embodiment, in view of the fact that no user modified setting values are specified in respect of repository file 0x0B, no second version of the repository file is stored on the system partition 118. Instead, in this example embodiment only the unmodified version of repository file 0x0B is stored on the OS partition 116 as firmware. In this example embodiment, in operation, when the computing device is required to read a repository file, the computing device reads the version of the repository file from the system partition 118, if one exists. If a version does not exist on the system partition 118 then the computing device uses the unmodified version of the repository file stored on the OS partition 116. In this example embodiment, if the computing device is required to write data to a repository file then, the computing device writes to the version of the repository file stored on the system partition 116. As mentioned previously, in this example embodiment the system partition 118 represents a writable portion of the long-term storage 114 whereas the OS partition 116 represents a read-only portion of the long-term storage 114. Also mentioned previously, in this example embodiment the central repository server (located on the application processor 108 of FIG. 2) is responsible for managing firmware settings. In this example embodiment, if the computing device is required to modify a repository file and no version of that repository file exists on the system partition 118 then, the central repository server copies the unmodified version from the OS partition 116 to the system partition 118 and incorporates the user's modification. In view of the above, in this example embodiment a list of repository files for which modified values exist can be obtained by identifying which repository files have versions stored on the system partition 118.

In this example embodiment, also present on the OS partition 116 is a cyclic redundancy check (CRC) file 600. In this example embodiment, when the software of the smartphone 2 is created (i.e. at build-time), a CRC file is created and stored in the OS partition 116 containing a CRC value for each repository file which is stored as firmware on the OS partition 116. For example, the CRC file 600 contains an entry for each repository file stored on the OS partition 116. In this example embodiment, each repository file of OS partition 116 is referenced in the CRC file 600 by its UID and, a CRC value is associated with each UID. Accordingly, in this example embodiment the CRC file contains a list of UID and corresponding CRC pairs. For example, the CRC file 600 contains the following data, file 0x0A has CRC value 1001; file 0x0B has CRC value 1002; file 0x0C has CRC value 1003; and, file 0x0D has CRC value 1004. In this example embodiment, the CRC file 600 is called 'romcrc.bin'.

In this example embodiment, the central repository server copies the CRC file 600 from the OS partition 116 to a defined location on the system partition 118 when the device is first booted up or whenever the device is booted up following being formatted. Stated differently, in this example embodiment a representation of each repository file stored on the OS partition 116 is stored independently from those repository files. Accordingly, a copy of the CRC file 600 is stored on the system partition 118, as indicated by reference sign 602.

In the example embodiment of the flow diagram of FIG. 4, the operation of the smartphone 2 in response to a FOTA update is described below. In this example embodiment, the FOTA update includes an updated version of repository file 0x0A and the existing versions of repository files 0x0B, 0x0C and 0x0D.

In this example embodiment, at block 301, when the smartphone 2 is booted up the central repository server checks a defined location on the system partition 118 for a file containing a CRC value for each repository file stored as firmware in the OS partition 116 of the long-term storage 114 (i.e. the repository files 0x0A to 0x0D from FIG. 3). In the example embodiment of FIG. 3, a copy of the CRC file 600 is already present on the system partition 118, as indicated by reference sign 602. In the example embodiment of FIG. 4, at block 303, if the CRC file 602 did not exist then the central repository server copies the CRC file 600 from the OS partition 116 to the defined location on the system partition 118. On subsequent boot-ups the CRC file 602 exists at the defined location on the system partition 118 and the central repository server detects this. In this example embodiment, the absence of a copy of the CRC file 600 on the system partition 118 indicates that it is the first time the smartphone 2 has been booted-up or, the smartphone 2 has just been formatted.

The example embodiment of FIG. 3 shows the status of the system partition 118 and the OS partition 116 before a FOTA update has been received but after the CRC values have been copied to the system partition 118. In this example embodiment, the CRC values contained in both the CRC file 600 and the CRC file 602 correspond to repository files in their unmodified or default state. Therefore, the CRC files 600 and 602 contain a CRC value for each repository file stored as firmware on the OS partition 116.

Figure 4:
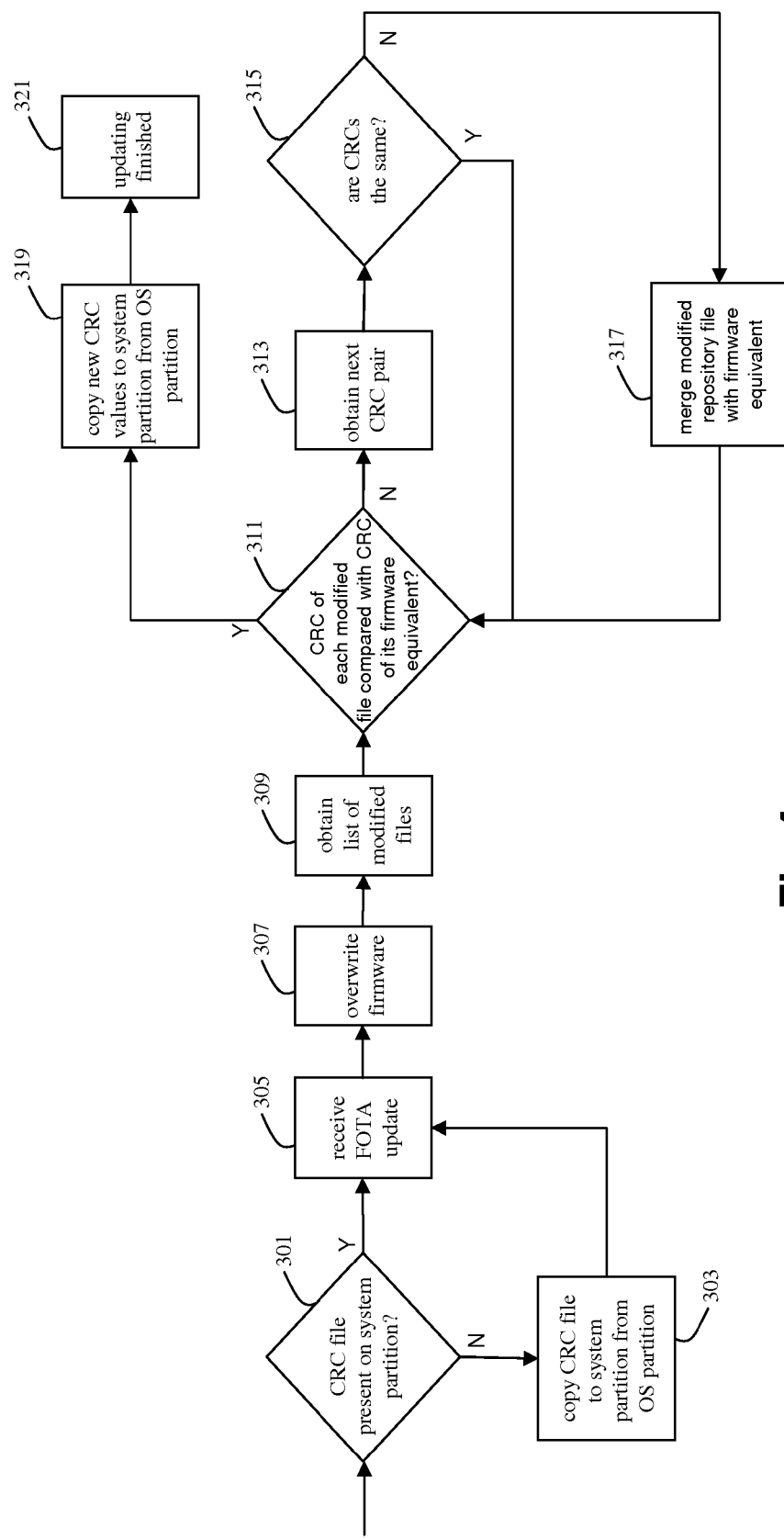

In the example embodiment of FIG. 4, at block 305, the smartphone 2 receives a FOTA update during its normal operation. In this example embodiment, the FOTA update contains an updated version of the smartphone's firmware. At block 307, the new updated version of firmware is written onto the long-term storage 114 overwriting a corresponding older version of firmware. This operation can be seen more particularly in the example embodiment of FIG. 5.

Figure 5:
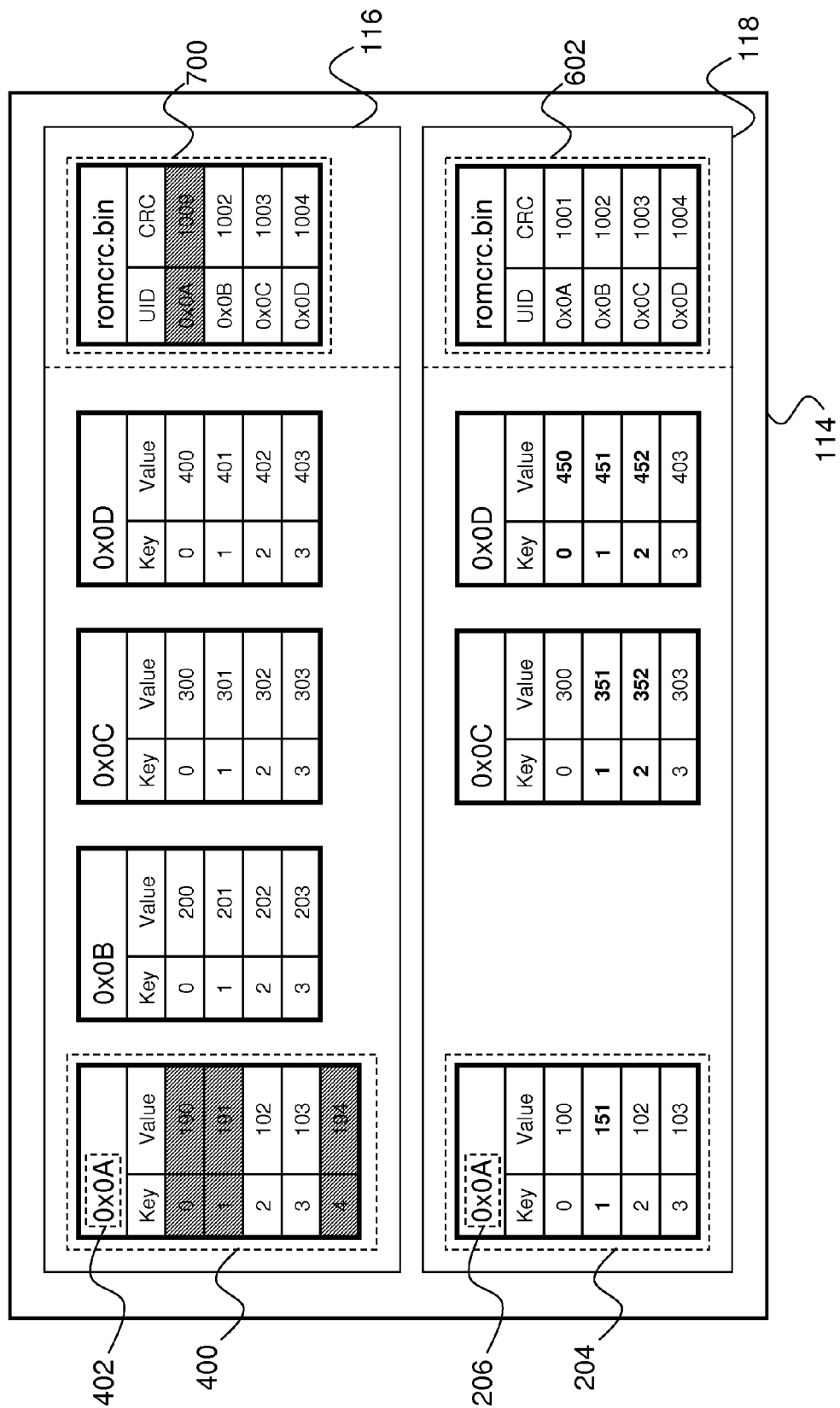

In this example embodiment, the FOTA update comprises an updated version of the repository file 0x0A, illustrated on FIG. 5 as a repository file 400. In this example embodiment, the repository file 400 contains a UID 402 having a value 0x0A, and contains five settings, each one having a unique key from 0 to 4. In this example embodiment, the difference between the pre-updated version (repository file 200 of FIG. 3) and the updated version (repository file 400 of FIG. 5) is the addition of a fifth setting (i.e. the setting with key 4) and, the change of both setting 0 (from a value of 100 to 190) and setting 1 (from 101 to 191), as indicated by shading in FIG. 5. In this example embodiment, none of the repository files 0x0B to 0x0D stored on the OS partition 116 have been changed by the FOTA update.

In this example embodiment, a repository file may be updated as described with reference to repository file 0x0A to provide the smartphone 2 with new functionality. For example, a new feature may be added based on either location based services or calendar entries. This new feature may require the smartphone 2 to switch from a normal ring tone to a silent ring tone based on either a location or a diary entry (i.e. when the smartphone enters a library or when a diary schedule states the user is in a meeting). In this example case the smartphone 2 would need to be updated with a new setting to allow the user to enable this new functionality. In a further example, an existing setting may be updated. For example, a setting's possible range of values or default value may be changed.

In this example embodiment, in addition to repository files, the FOTA update also contains a new CRC file containing an entry for each repository file contained within the FOTA update. As was mentioned previously, in this example embodiment a FOTA update can contain a complete version of every repository file of the computing device. For example, those files which are changed by the update are included in the update in their changed state whereas those files which are not changed by the update are simply included in their existing state. Therefore, in this example embodiment the FOTA update can contain a CRC file containing an entry for every repository file of the computing device in its updated and unmodified form. In this example embodiment, the new CRC file overwrites the CRC file 600 on the OS partition 116. This operation can be seen on FIG. 5 wherein a new CRC file 700 replaces the CRC file 600 of FIG. 3. In this example embodiment, the CRC file 700 corresponds with the updated repository file 0x0A and accordingly contains a different CRC value for repository file 0x0A than the value carried by CRC file 600. For example, the CRC value for the old repository file 0x0A was 1001 whereas the CRC value for the new repository file 0x0A is 1009. In this example embodiment, repository files 0x0B, 0x0C and 0x0D are not changed by the FOTA update. Accordingly, in this example embodiment the CRC values contained in CRC file 700 for repository files 0x0B, 0x0C and 0x0D are the same as those contained in CRC file 600. It is noted that because the old CRC file 600 was copied to the system partition 118 the smartphone 2 according to this example embodiment retains a CRC value for each repository file which was present on the OS partition 116 before the FOTA update was received in file 602. In this example embodiment, once the updated data contained within the FOTA update has been copied to the OS partition 116 of the long-term storage 114 the computing device may re-boot.

In this example embodiment, in order to fully integrate the updated portion of firmware received by the FOTA update into the smartphone 2 the contents of the system partition 118 must be changed to represent the new repository file 400. For example, modifications or customisations stored as modifiable data on the system partition 118 must be merged with the updated version of the repository file stored as firmware on the OS partition 116. In this example embodiment, this operation ensures that if a setting of a pre-update version of an updated repository file has been modified according to a specified value then that modification is transferred to the corresponding setting of the updated repository file. It is important that the updating process does not, for example, revert user-modified values to their default value. Further, in this example embodiment it would not be correct to overwrite all the user's personalisation of a repository file when adding one new setting to the repository file. Instead, in this example embodiment a merging needs to occur that keeps the user-modified values, changes updated unmodified values, and adds the new setting with its default value.

In this example embodiment, the act of merging compares two versions of a repository file, a new version (in OS partition 116) and an old version (in system partition 118). The comparison establishes, which settings are modified, which are updated, and which new settings have been added. Based on this comparison, modified settings of the old version retain their modified value. Also, unmodified settings of the old version take the updated value of the corresponding setting from the new version. Further, any new settings in the new version are added to the old version. Accordingly, in this example embodiment the repository file is updated without loosing any user preferences.

In this example embodiment, at block 309 the central repository server obtains a list of which repository files have been modified by a user by identifying which repository files are stored on the system partition 118. In this example embodiment the central repository server provides a means for identifying repository files for which at least one specified value (i.e. modified value) exists. Once the list of modified repository files has been obtained the corresponding UIDs are loaded into RAM 112.

In this example embodiment, CRC values from the CRC files 700 and 602 which correspond to each listed repository file are compared with each other to identify which repository files have been changed by the FOTA update. In this example embodiment, at block 311, a test is performed to determine if any CRC value pairs still need to be compared. In this example embodiment, no comparisons have to be made. In this example embodiment, at block 313 the CRC value for the first listed repository file (i.e. repository file 0x0A) is obtained by the central repository server from both the CRC file 700 and the CRC file 602. In this example embodiment, these CRC values are then loaded into the RAM 112. In this example embodiment, at block 315 the central repository file compares the CRC value pair obtained at block 313 in RAM 112. In this example embodiment, if the CRC values are identical then the central repository server deduces that the repository file has not been changed by the FOTA update and therefore, no merging operation is performed. Alternatively, if the CRC values are different then merging is performed. In this example embodiment the central repository file provides a means for detecting user-modified repository files (i.e. those having at least one specified value) which have been updated. As seen more particularly in the example embodiment of FIG. 5, the CRC values compared are 1009 (from CRC file 700) and 1001 (from CRC file 602) and so merging is performed.

In the example embodiment of FIG. 4, at block 317 the central repository server merges the repository file 204 with its firmware equivalent, repository file 400. In this example embodiment the central repository file provides a means for merging specified values (i.e. user-modified values) with repository files. For example, non-user-modified settings from repository file 204 which have a different value to the corresponding setting from repository file 400 (i.e. only the setting with key 0) are altered to equal the value of the setting from repository file 400. In this example embodiment, this process involves making setting 0 of repository file 204 equal to setting 0 of repository file 400. Also, any new settings which have been added to the firmware based repository file (i.e. setting 4 of repository file 400) are added to the corresponding system partition 118 based repository file with their default value. In this example embodiment, this process involves adding a new setting to repository file 204 having a key of 4 and a value of 194. These operations complete the process of merging repository file 204 with repository file 400.

In this example embodiment, at block 311 the central repository server determines if there are any listed modified repository files for which CRC values have not been compared. In this example embodiment, two further repository files must be processed, 0x0C and 0x0D. However, as can be seen on the example embodiment of FIG. 5, the CRC values for both 0x0C and 0x0D contained in the CRC file 602 are the same as those in the CRC file 700. Therefore, in the example embodiment of FIG. 4 no further merging takes place. In this example embodiment, all listed repository files have been processed once each file's CRC values have been compared and a merging operation is performed if they are different, as discussed above. In this example embodiment, at block 319 the CRC file 700 is copied from the OS partition 116 to the system partition 118 to overwrite CRC file 602 and form a new CRC file, indicated in the example embodiment of FIG. 6 by reference numeral 702. In the example embodiment of FIG. 4, at block 321 updating is complete.

Figure 6:
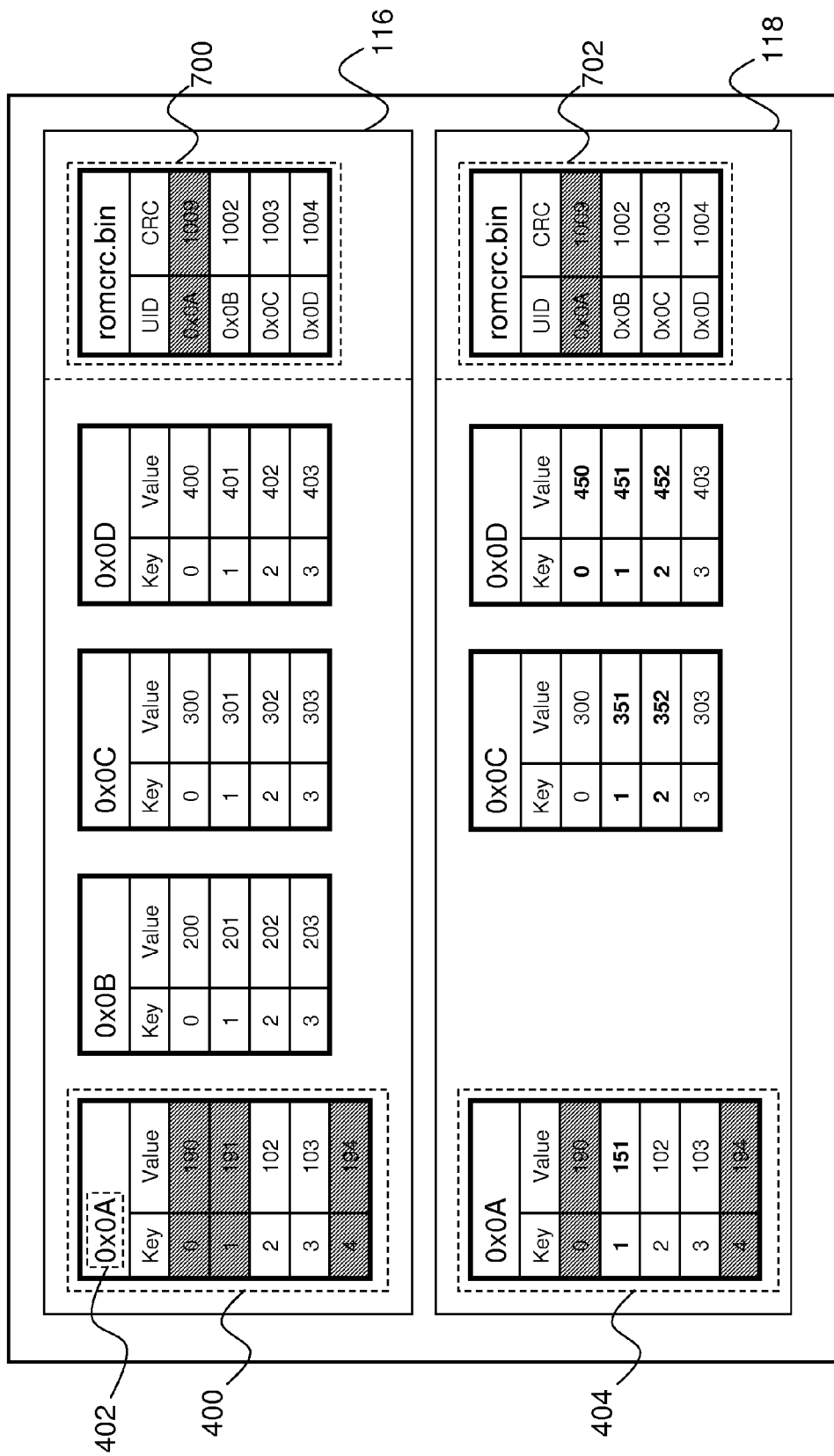

In the example embodiment of FIG. 4 the values of any non-user-modified settings in the system partition 118 based repository files are changed to equal corresponding settings from the firmware version of the repository file stored on the OS partition 116, if those settings have been updated. The example embodiment of FIG. 6 illustrates the result of the operation described with reference to the example embodiment of FIG. 4. For example, the altered setting 0 and the new setting 4 of updated repository file 0x0A (400) have been copied to the modified version of the repository file 0x0A stored on the system partition 118 and identified by reference numeral 404. It is noted that repository file 0x0B was not merged in this example embodiment because a modified version of repository file 0x0B does not exist on system partition 118.

It is an advantage of the example embodiments of FIGS. 1 to 6 that modified repository files stored on the system partition are only merged with an equivalent firmware version when the FOTA update changes the firmware version. Therefore, system resources are not wasted merging modified repository files which have not been changed by the FOTA update. Moreover, it is also an advantage of these example embodiments that the time taken by the computing device to reach an operational state is reduced after the FOTA update is received thereby improving the user experience.

It is an advantage of the example embodiments of FIGS. 1 to 6 that the computing device is able to identify repository files for which a specified value exists. Further, in these example embodiments the computing device can determine those identified files which have been updated by a FOTA update, after the FOTA update has been received, by comparing two representations of the file. In these example embodiments, one representation represents the repository file in an unmodified or default state before the FOTA update was received and, the other representation represents the repository file in an unmodified or default state after the FOTA update was received. In these example embodiments, the device can determine if an identified repository file has not been changed by a FOTA update and therefore, the device can avoid merging that identified repository file to conserve computing device resource. In these example embodiments, the processing resource required to compare representations of repository files is significantly less than the processing resource required to unnecessarily merge identified repository files which are unchanged by the FOTA update. These example embodiments conserve resources of the computing device causing the device to execute the FOTA update faster than if all modified files are merged irrespective of whether or not they have been changed by the FOTA update. By executing the FOTA update faster the user experience is improved, particularly because the time taken for the device to return to an operational state following the update is reduced.

It is an advantage of the example embodiments of FIGS. 1 to 6 that cyclic redundancy check values are used as representations because the computing device is already capable of calculating and storing these values. It is also an advantage of these example embodiments that cyclic redundancy check values are relatively small portions of data in comparison to the size of repository files. Therefore, processing cyclic redundancy check values requires considerably fewer resources than processing repository files. Thus in these example embodiments system resources are conserved when compared to a case where all modified files are merged irrespective of whether or not they have been changed by the FOTA update.

It is an advantage of the example embodiments of FIGS. 1 to 6 that the repository files are stored separately from the specified (i.e. modified) values so that repository files can be stored as firmware and the specified values can be stored as modifiable data. Therefore, in these example embodiments modifications can be associated with the write-protected firmware repository files and those modifications can be stored and retained as modifiable data on the non-volatile memory. According to these example embodiments, the read-only portion of the non-volatile memory is provided by the OS partition 116 of the long-term storage 114 of the computing device 2. Also, the writable portion of the non-volatile memory is provided by the system partition 118 of the long-term storage 114 of the computing device 2. In these example embodiments, the OS partition 116 and the system partition 116 are described in this way because access to write data to the OS partition 116 can be more restricted than access to write data to the system partition 118.

It is an advantage of the example embodiments of FIGS. 1 to 6 that modifications relating to a write-protected repository file which is stored on the read-only portion 116 of the non-volatile memory 114 can be stored on the writable portion 118 of the non-volatile memory 114 with the rest of the repository file data. Accordingly, an up-to-date version of the repository file which includes all related modifications is maintained on the writable portion 118 of the non-volatile memory 114.

It is an advantage of the example embodiments of FIGS. 1 to 6 that merging copies modifications from a pre-update version of a repository file to a post-update (updated) version of the repository file, after a FOTA update is received. For example, it is an advantage that the second version of the repository file stored on the writable portion 118 of the non-volatile memory 114 is altered to contain changes from the updated version of the file stored on the read-only portion 116 of the non-volatile memory 114, provided those updates do not conflict with any predefined specified (i.e. modified) values. Therefore, in these example embodiments modifications are retained when a FOTA update is received.

It is an advantage of the example embodiments of FIGS. 1 to 6 that the cyclic redundancy check values are copied onto the writable portion 118 of the non-volatile memory 114 in advance of receiving a FOTA update so that the computing device 2 retains a representation of the previous state of the repository files after the FOTA update has been received. The computing device 2 of these example embodiments is therefore, able to compare a representation of each repository file before the FOTA update was received with a representation of the repository file after the FOTA update is received. In these example embodiments, the cyclic redundancy values are copied into the writable portion 118 of the non-volatile memory 114 the first time the computing device 2 is switched-on and during re-boot each time after the device is formatted.

It is an advantage of the example embodiments of FIGS. 1 to 6 that the computing device is able to identify repository files for which at least one specified value exists because it is only necessary to merge updated versions of those repository files. Therefore, as the computing device 2 is capable of identifying repository files for which specified values do not exist, the computing device 2 may omit these repository files from further post-update processing. This represents a conservation of system resources which translates to an improvement in user experience.

It is an advantage of the example embodiments of FIGS. 1 to 6 that user-modifications are retained following receipt of a FOTA update.

In the example embodiments of FIGS. 1 to 6, it should be noted that storing representations of firmware repository files (i.e. those stored on the OS partition 116) independently from the firmware repository files before receiving a FOTA update enables the central repository server to determine, after a FOTA update, which firmware repository files have been updated. In the example embodiments, the CRC file 600 is copied from the OS partition 116 to the system partition 118 to generate CRC file 602 before receiving the FOTA update. Stated differently, by storing the representations independently from the firmware files the representations are not overwritten when a FOTA update is received. According to this operation, the smartphone 2 of these example embodiments is capable of identifying which modified files have been updated after an update and therefore, can limit merging to only those files.

Within the example embodiments of FIGS. 1 to 6, each setting is user-modifiable. However in another example embodiment at least one of the settings of one or more repository files is modifiable by the computing device itself, instead of, or in addition to, being modifiable by a user of the computing device. For example, an internet application may automatically detect internet connection settings and modify the appropriate entries itself.

Within the example embodiments of FIGS. 1 to 6, the FOTA update has been considered within the context of updating an existing repository file with a new setting or a modification to an existing setting. However, in another example embodiment the computing device receives a FOTA update which contains a completely new repository file, containing one or a number of settings.

Within the example embodiments of FIGS. 1 to 6, the FOTA update provides updated firmware for the OS partition 116 of the long-term storage 114 of the computing device. However, another example embodiment is capable of operating with FOTA updates containing other types of computer code, for example, modifiable data. For example, in another example a FOTA update may update other computer code stored on the long-term storage, such as application programs, and the like, and in particular those application programs which are mandatory to the device, such as, in the case of a smartphone, communications applications and the like.

Some examples of the present invention are suitable for use with any modifiable application or system setting of the computing device. Another example operates with an email functionality, wherein suitable settings are an email address or a pop server configuration. Another example operates additionally or alternatively with a mapping functionality, wherein suitable settings are a home location or a graphical configuration, such as, a particular colour scheme. Another example operates additionally or alternatively with a radio functionality, wherein suitable settings are one or a number of radio frequency presets or services, or a volume setting. Another example operates additionally or alternatively with an internet browsing functionality, wherein suitable settings are a home page address or one or a number of internet connection settings.

Finally, various additions and modifications may be made to the above described example embodiments to provide further example embodiments, apparent to the intended reader being a person skilled in the art, any and all of which are intended to fall within the scope of the appended claims. Further, one or more aspects of two or more example embodiments may be combined to create a one or more further example embodiments.

The invention claimed is:

1. A method comprising:
   a. receiving a firmware over-the-air update in an apparatus having a plurality of repository files, each repository file comprising one or more settings, at least one setting of each repository file being modifiable to equal one of one or more corresponding specified values, the update overwriting at least one repository file with an updated version;
   b. identifying repository files for which at least one corresponding specified value exists; and
   c. detecting one or more of the identified repository files which have been updated by comparing a representation of each identified repository file from before the update was received with a representation of the identified repository file after the update was received, and for the each updated identified repository file, merging the at least one corresponding specified value with the updated identified repository file;
   wherein the representation of each repository file is a cyclic redundancy check value of the repository file; and
   wherein a second version of each repository file for which at least one specified value exists is stored in a non-transitory computer readable medium, each specified value being stored in place of its corresponding setting, and wherein merging the at least one corresponding specified value with the updated identified repository file comprises setting said each setting of the second version, for which no corresponding specified value exists, equal to the corresponding setting of the updated version of the updated identified repository file.

2. The method as claimed in claim 1 wherein merging the at least one corresponding specified value with the updated identified repository file is performed for only the each updated identified repository file.

3. The method as claimed in claim 1 wherein the repository files are stored on a read-only portion of a non-volatile memory of the apparatus and the specified values are stored on a writable portion of a non-volatile memory of the apparatus.

4. The method as claimed in claim 1 wherein each representation of the repository file from before the update was received is stored independently from the plurality of repository files before the update is received so that each representation is not overwritten by the update.

5. The method as claimed in claim 1 wherein each repository file contains a group of settings which all relate to a common functionality.

6. The method as claimed in claim 1 wherein each repository file contains a group of settings which all relate to a profile of the apparatus.

7. An apparatus, comprising:
at least one processor; and
at least one memory including computer program code,
the at least one memory and the computer program code configured to, with the at least one processor, cause the apparatus to perform at least the following:
receive a firmware over-the-air update in the apparatus, the apparatus having a plurality of repository files, each repository file comprising one or more settings, at least one setting of each repository file being modifiable to equal one of one or more corresponding specified values, the update overwriting at least one repository file with an updated version;
identify repository files for which at least one corresponding specified value exists; and
detect one or more of the identified repository files which have been updated by comparing a representation of each identified repository file from before the update was received with a representation of the identified repository file after the update was received, and for the each updated identified repository file, merge the at least one corresponding specified value with the updated identified repository file;
wherein the representation of each repository file is a cyclic redundancy check value of the repository file; and
wherein a second version of each repository file for which at least one specified value exists is stored in a non-transitory computer readable medium, each specified value being stored in place of its corresponding setting, and wherein merging the at least one corresponding specified value with the updated identified repository file comprises setting said each setting of the second version, for which no corresponding specified value exists, equal to the corresponding setting of the updated version of the updated identified repository file.

8. The apparatus as claimed in claim 7 wherein merging the at least one corresponding specified value with the updated identified repository file is performed for only the each updated identified repository file.

9. The apparatus as claimed in claim 7 wherein the repository files are stored on a read-only portion of a non-volatile memory of the apparatus and the specified values are stored on a writable portion of a non-volatile memory of the apparatus.

10. The apparatus as claimed in claim 9 wherein the cyclic redundancy check value is stored on the read-only portion of the non-volatile memory for each repository file of the read-only portion and each cyclic redundancy value is copied onto the writable portion of the non-volatile memory before the apparatus receives the firmware-over-the-air update.

11. The apparatus as claimed in claim 9 wherein identifying repository files for which at least one corresponding specified value exists comprises inspecting the writable portion of the non-volatile memory for data corresponding to repository files.

12. The apparatus as claimed in claim 7 wherein each representation of the repository file from before the update was received is stored independently from the plurality of repository files before the update is received so that each representation is not overwritten by the update.

13. The apparatus as claimed in claim 7 wherein each repository file contains a group of settings which all relate to a common functionality.

14. The apparatus as claimed in claim 7 wherein each repository file contains a group of settings which all relate to a profile of the apparatus.

15. A computer program product comprising a non-transitory computer-readable medium bearing computer program code embodied therein for use with a computer, the computer program code comprising:
a. code for receiving a firmware over-the-air update in an apparatus having a plurality of repository files, each repository file comprising one or more settings, at least one setting of each repository file being modifiable to equal one of one or more corresponding specified values, the update overwriting at least one repository file with an updated version;
b. code for identifying repository files for which at least one corresponding specified value exists; and
c. code for detecting one or more of the identified repository files which have been updated by comparing a representation of each identified repository file from before the update was received with a representation of the identified repository file after the update was received; and for the each updated identified repository file, merging the at least one corresponding specified value with the updated identified repository file;
wherein the representation of each repository file is a cyclic redundancy check value of the repository file; and
wherein a second version of each repository file for which at least one specified value exists is stored in a non-transitory computer readable medium, each specified value being stored in place of its corresponding setting, and wherein merging the at least one corresponding specified value with the updated identified repository file comprises setting said each setting of the second version, for which no corresponding specified value exists, equal to the corresponding setting of the updated version of the updated identified repository file.

* * * * *